April 17, 1934.     F. E. CHAVANNES     1,955,226
BALL AND SOCKET PISTON STRUCTURE
Filed June 19, 1933
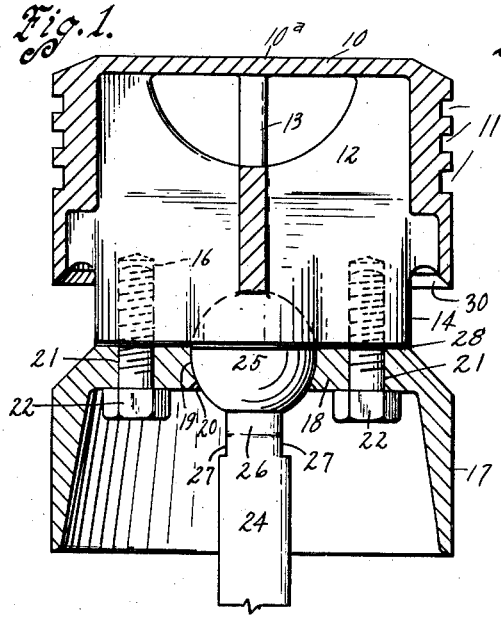
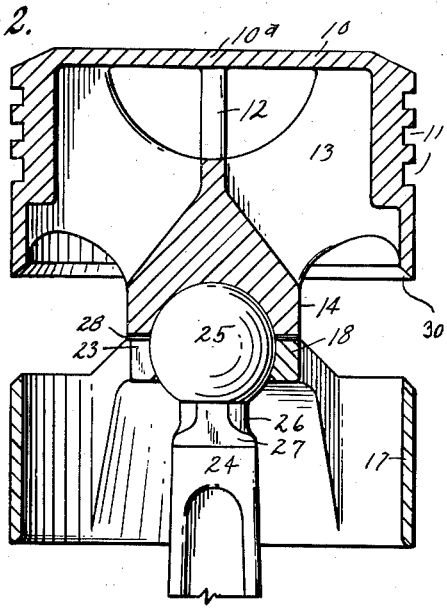
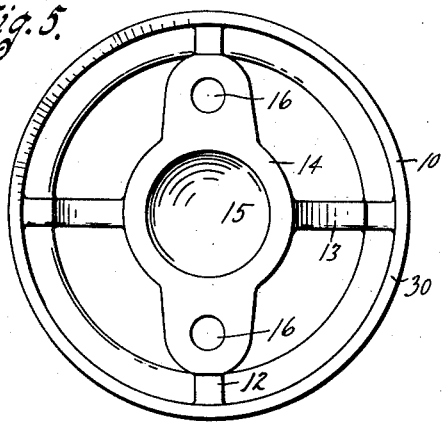
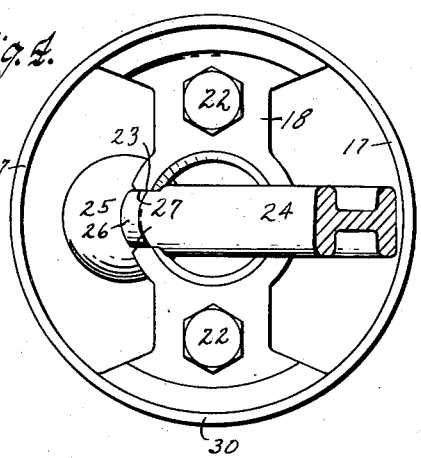
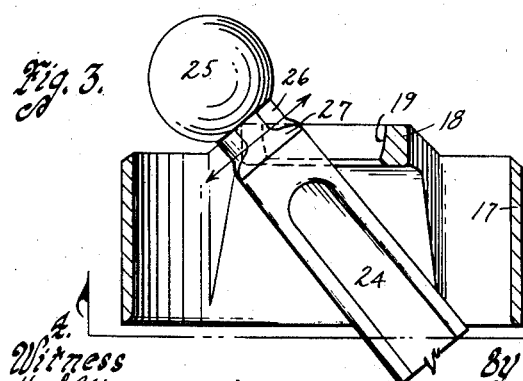
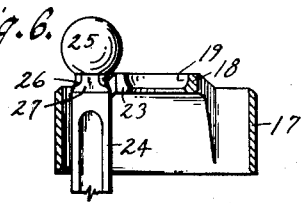
Inventor
Francis E. Chavannes
By Bair, Freeman & Sinclair
Attorneys
Witness
H. S. Munzenmaier Patented Apr. 17, 1934

1,955,226

UNITED STATES PATENT OFFICE 1,955,226

BALL AND SOCKET PISTON STRUCTURE

Francis E. Chavannes, Des Moines, Iowa

Application June 19, 1933, Serial No. 676,496

1 Claim. (Cl. 309—20)

The object of my invention is to provide a piston assembly of simple, durable and inexpensive construction.

More particularly, it is my purpose to provide a two-part piston so constructed as to proivde a socket for receiving a ball formed integrally on a piston rod for affording a piston and piston rod connection of the ball and socket joint type which will allow free movement of the piston with relation to the piston rod.

With these and other objects in view, my invention consists in the construction, arrangement and combination of the various parts of my floating ball and socket piston structure, whereby the objects contemplated are attained, as hereinafter more fully set forth, pointed out in my claim, and illustrated in the accompanying drawing, in which:

Figure 1 is a vertical, sectional view through a piston structure embodying my invention.

Figure 2 is a similar view taken at right angles to the view shown in Figure 1.

Figure 3 is a vertical, detailed, sectional view of cne of the piston parts illustrating the manner of assembling the piston rod therewith.

Figure 4 is an inverted plan view of the last-mentioned piston member and of the rod, the rod being shown partially in section, the view being designed to illustrate the mode of assembly of these parts.

Figure 5 is an inverted plan view of the other piston part; and

Figure 6 is a vertical, sectional view of the lower piston member and the upper end of the piston rod.

In the accompanying drawing, I have used the reference numeral 10 to indicate one part, being the upper part, of a piston. The piston member 10 has the usual head 10a with the ring grooves 11. The piston member 10 is hollow except for radial ribs 12 and 13, which extend inwardly and are formed integral with the member 10.

Formed at the lower part of the ribs is the upper half 14 of a clamp member, at the center of which is a downwardly opening socket 15. The clamp is generally oblong, and except for the socket has a smooth lower face near the vertical center of the complete piston.

On either side of this face are threaded screw holes 16.

The lower or skirt part of the piston 17 has a bridge 18 extending across its upper part and having at its upper face a socket 19 to cooperate with the socket member 15 in receiving a ball.

In the bottom of the socket 19 is an annular hole 20.

The bridge 18 is provided with screw holes 21 which register with the holes 16 when the piston and piston rod are assembled. The thickness of the bridge 18 is about three-eighths of the diameter of the ball to be used, in order to allow sufficient free movement of the piston with relation to the piston rod in the completed assembly.

When the head part 10 and the skirt part 17 of the piston are assembled by means of the screw bolts 22, there is formed between them a spherical socket for the accommodation of the ball on the end of the connecting rod.

The bridge 18 has at one side an open slot 23 illustrated in Figures 3 and 4 for example.

The piston rod is indicated at 24. It has at its upper end an integrally formed ball 25. Between the rod 24 proper and the ball head 25 is a reduced neck 26 having opposite parallel flat sides 27, shown best in Figure 4.

The length of the flat sides 27 longitudinally of the piston rod is such that when the piston rod is upright and the skirt member 17 is upright and the piston rod is inserted upwardly between the wall and the bridge of the member 17, as shown in Figure 6, the neck 26 will not pass through the slot 23 by horizontal movement of the piston rod. However, if the piston rod is tilted to an angular position as shown in Figures 3 and 4, then the neck of the piston can be slipped through the slot 23, and the parts will remain in their assembled position and can not be disassembled without again tilting the rod for permitting the neck to pass through the slot 23.

There is thus provided a piston structure characterized by extreme simplicity. Only five parts, including the two screws are necessary for assembling the piston and the piston rod. To this there may be made the exception that I preferably provide a series of shims 28 of different thicknesses between the two piston members. One or more of the shims may be removed when desired for tightening the clamp members, comprising the member 14 and the bridge 18, when that is desired, to afford adjustment and compensation for wear.

The small number of parts makes for simplicity and economy in manufacture and installation.

The entire device has all of the advantages of a free floating piston and especially a piston which can rotate.

It is obvious that there is a gap at the exterior of the piston between the upper member 10 and the lower member 17. It will be observed that the lower edge of the upper piston member 10 is beveled from the inside downwardly and outwardly as at 30.

The structure just mentioned makes for more satisfactory oiling of the interior of the cylinder and yet the beveled edge 30 tends to carry the oil on the cylinder wall downwardly to help to prevent passage of oil upwardly past the piston into the combustion chamber of the cylinder.

With a piston of this kind, the ordinary tendency toward the cylinder into an oval form is entirely eliminated.

I claim as my invention:

A two-part piston assembly comprising a head piston member provided in its lower part with a smooth face having a socket and threaded screw holes, a piston skirt member having in its upper part a bridge provided with a socket having an aperature in its bottom and having spaced screw holes adapted to register with the first-named screw holes when the device is assembled, said bridge having a slot for the insertion of the neck of a piston rod, and the piston rod having a ball formed integrally on one end thereof and a neck adjacent the ball with flat parallel sides of greater vertical length than the vertical length of said slot, but of such length as to permit the insertion of the neck when the rod is tilted.

FRANCIS E. CHAVANNES.